US008018969B2

(12) United States Patent
Shim et al.

(10) Patent No.: US 8,018,969 B2
(45) Date of Patent: *Sep. 13, 2011

(54) METHOD AND APPARATUS FOR CONSTRUCTING MAP IE USING REDUCED CID IN BROADBAND OFDMA SYSTEMS

(75) Inventors: Jae-Jeong Shim, Seoul (KR); Geun-Hwi Lim, Seongnam-si (KR); Hong-Sung Chang, Suwon-si (KR); Jung-Shin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 849 days.

This patent is subject to a terminal disclaimer.

(21) Appl. No.: 11/077,718

(22) Filed: Mar. 11, 2005

(65) Prior Publication Data

US 2005/0201269 A1    Sep. 15, 2005

(30) Foreign Application Priority Data

Mar. 12, 2004 (KR) .................. 10-2004-0017811

(51) Int. Cl.
    *H04J 3/00* (2006.01)
    *H04J 3/18* (2006.01)
(52) U.S. Cl. .................................... 370/476; 370/477
(58) Field of Classification Search ............ 370/208, 370/329–330, 395.3, 470, 472, 474, 476, 370/477
    See application file for complete search history.

(56) References Cited

U.S. PATENT DOCUMENTS

| 5,406,403 | A | * | 4/1995 | Griffin et al. ............ 398/98 |
| 5,414,701 | A | * | 5/1995 | Shtayer et al. ......... 370/395.3 |
| 5,481,687 | A | * | 1/1996 | Goubert et al. ............. 711/212 |
| 5,566,172 | A | * | 10/1996 | Mourot ................. 370/347 |
| 5,889,474 | A | * | 3/1999 | LaDue ................ 340/825.49 |
| 6,313,763 | B1 | * | 11/2001 | Lambert .................. 341/50 |
| 6,707,856 | B1 | | 3/2004 | Gardner et al. |
| 6,711,164 | B1 | * | 3/2004 | Le et al. ................... 370/392 |
| 6,717,956 | B1 | * | 4/2004 | Fan et al. .................. 370/477 |
| 6,917,616 | B1 | * | 7/2005 | Normand et al. ........ 370/395.1 |
| 6,934,276 | B1 | * | 8/2005 | Abrol et al. ............... 370/349 |

(Continued)

FOREIGN PATENT DOCUMENTS

EP    1 571 865    9/2005

(Continued)

OTHER PUBLICATIONS

Chang et al.: "Method for Shortening the MOB_TRF_IND message through reducing size of the CID field by replacing it with a Short Basic CID", May 2004.

(Continued)

*Primary Examiner* — Xavier Szewai Wong
(74) *Attorney, Agent, or Firm* — The Farrell Law Firm, P.C.

(57) ABSTRACT

A method for transmitting burst allocation information by a base station in a broadband wireless communication system in which a transmitted frame includes symbols, and orthogonal subcarriers in a frequency axis constitute each of the symbols based on a predetermined time unit. The method includes the steps of generating a reduced connection identifier (CID) by reducing a basic CID of a mobile terminal connected to the base station when the basic CID exists within a preset range, and inserting an MAP, which includes an enabled field representing the reduced CID and one of use and non-use of the reduced CID, into the frame, and transmitting the frame to the mobile terminal.

6 Claims, 12 Drawing Sheets

U.S. PATENT DOCUMENTS

| | | | |
|---|---|---|---|
| 7,236,836 B1* | 6/2007 | Tanaka et al. | 700/94 |
| 7,366,121 B1* | 4/2008 | Mitchell et al. | 370/310.1 |
| 2001/0050890 A1* | 12/2001 | Okamoto et al. | 369/59.24 |
| 2002/0061757 A1 | 5/2002 | Hunzinger | |
| 2002/0071411 A1* | 6/2002 | Masui et al. | 370/335 |
| 2002/0097723 A1* | 7/2002 | Tourunen et al. | 370/392 |
| 2004/0127244 A1* | 7/2004 | Matsumoto et al. | 455/517 |
| 2004/0165527 A1* | 8/2004 | Gu et al. | 370/229 |
| 2004/0246966 A1* | 12/2004 | Wu et al. | 370/395.1 |
| 2005/0041573 A1 | 2/2005 | Eom et al. | |
| 2005/0207369 A1* | 9/2005 | Bolourchi et al. | 370/320 |
| 2010/0142473 A1* | 6/2010 | Shim et al. | 370/329 |

FOREIGN PATENT DOCUMENTS

| | | |
|---|---|---|
| JP | 2000-32550 | 1/2000 |
| JP | 2002-259916 | 9/2002 |
| JP | 2003-318859 | 11/2003 |
| KR | 1020020032679 | 4/2002 |
| KR | 1020030079612 | 10/2003 |
| RU | 2111619 | 12/1990 |
| RU | 2172077 | 12/1996 |
| RU | 2178623 | 1/2002 |
| WO | WO 97/23108 | 6/1997 |

OTHER PUBLICATIONS

IEEE 802.16 Broadband Wireless Access Working Group, XP 002538929, May 19, 2004.

Broadband Radio Access Networks (BRAN) HIPERMAN; Data Link Control (DLC) Layer, ETSI TS 102 178 V1.1.1, ETSI Standards, Nov. 1, 2003.

* cited by examiner

| Syntax | Size | Notes |
|---|---|---|
| UL_MAP_IE() { | | |
| CID | 16 bits | |
| UIUC | 4 bits | |
| If(UTUC==15) { | | |
| Extended UIUC dependent IE | variable | |
| } else | | |
| Offset | 12 bits | offset, in units of minislots, of the preamble relative to the Allocation Start Time |
| } | | |

FIG.3A
(PRIOR ART)

| Syntax | Size | Notes |
|---|---|---|
| UL_MAP_IE() { | | |
| DIUC | 4 | |
| Start PS | 16 | The starting point of the burst, in units of PS where the first PS in a given frame has Srart PS = 0 |
| if (CID use enable by burst profile) { | | |
| CID | 16 bits | Unicast, multicast, or broadcast value |
| } | | |
| } | | |

FIG.3B
(PRIOR ART)

| CID | Value | Description |
|---|---|---|
| Initial RANGING | 0x0000 | Used by an SS during initial ranging as part of initial ranging process |
| Basic CIS | 0x0001_m | |
| Primary management | m+1_2m | |
| Transport CIDs and secondary Mgt CIDs | 2m+1_0xFEFE | |
| A_AS initial ranging CID | 0xFFFE | A BS supporting AAS shall use this CID when allocation a Initial Ranging period for AAS devices |
| Multicast polling CIDs | 0xFFFE_ 0xFFFD | An SS may be included in one or more multicast polling groups for the purposes of obtaining bandwidth via poll-ing These connections have no associated service flow |
| Padding CID | 0xFFFE | Used for transmission of padding information |
| Broadcast CID | 0xFFFF | Used for broadcast information that is transmitted on a downlink to all SS |

METHOD AND APPARATUS FOR CONSTRUCTING MAP IE USING REDUCED CID IN BROADBAND OFDMA SYSTEMS

PRIORITY

This application claims priority to an application entitled "Method and Apparatus for Constructing MAP IE Using Reduced CID in Broadband OFDMA System" filed in the Korean Intellectual Property Office on Mar. 12, 2004 and assigned Serial No. 2004-17811, the contents of which are incorporated herein by reference.

BACKGROUND OF THE INVENTION

1. Field of the Invention

The present invention relates to a broadband orthogonal frequency multiplexing access system, and more particularly to a method for allocating burst data to a Mobile Subscriber Station (MSS).

2. Description of the Related Art

Conventional mobile communication networks were developed to provide a voice-based service, that is, voice communication. The mobile communication network has inherent disadvantages in that the data transmission bandwidth is relatively narrow since transmission of voice data only does not need much bandwidth, and service charges are expensive. Recently, however, with the rise in demand for wireless services, including Internet access and multimedia content, the conventional mobile communication networks cannot satisfy user demand. The Institute of Electrical and Electronics Engineers (IEEE) 802.16e standardization group of the IEEE, an international standardization organization, is lobbying for the adoption of IEEE 802.16d as the standard for providing wireless broadband Internet service to fixed subscriber stations.

As compared with a conventional wireless technology, the IEEE 802.16d standard allows mass storage data to be transmitted in a short time by providing a wide bandwidth for data and allows channels to be used efficiently by sharing the channels by all users. However, in the IEEE 802.16d standard, all users connected to a base station share, and use, the common channel. Further, since a use interval of the channel by each user is allocated by the base station, the base station must inform each user of a MAP representing burst allocation information, so that each user can share and use the channel each frame. In the IEEE 802.16d standard, the MAP is classified into the UL_MAP and the DL_MAP, which are contained in front portions of each frame, and then transmitted to all users.

Figure 1:
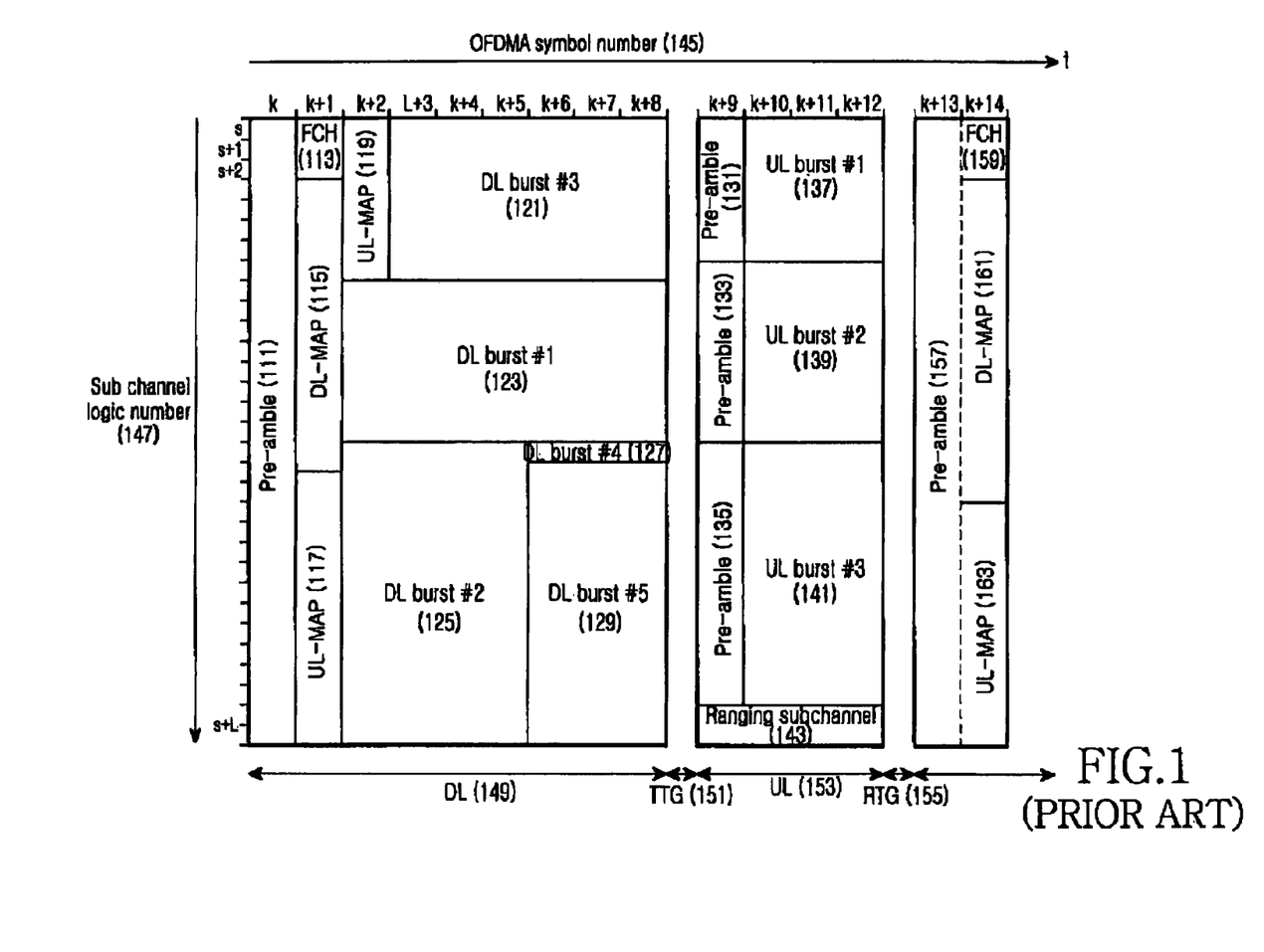
FIG. 1 is a diagram showing the frame structures of an uplink and a downlink in a broadband OFDMA system according to the prior art.

FIG. 1 is a diagram showing the frame structures of a downlink and an uplink in the IEEE 802.16d according to the prior art. Referring to FIG. 1, a vertical axis represents multiple subchannel numbers 147 and a horizontal axis represents Orthogonal Frequency Division Multiplexing Access (OFDMA) symbol numbers 145.

First, the downlink 149 will be described. A preamble 111 is located at a front portion of the subchannel constituting the downlink. Broadcast data information, such as a Frame Control Header (FCH) 113, a DL_MAP 115 and an UL_MAP 117 is located behind the preamble 111. Further, DL bursts 121, 123, 125, 127 and 129 are located behind the broadcast data information.

Next, in the uplink 153, preambles 131, 133 and 135 exist at a front portion of UL bursts 137, 139, and 141, respectively, with a ranging subchannel 143.

The DL_MAP 115 and the UL_MAP 117 include information regarding positions and allocation of the DL bursts 121, 123, 125, 127 and 129 and the UL bursts 137, 139 and 141. The information is transmitted from a base station to an MSS. Then, the MSS variably receives a subchannel with a combined frequency and symbol for each frame by means of the position and the allocation information of the UL bursts 137, 139 and 141 and the DL bursts 121, 123, 125, 127 and 129 contained in the DL_MAP 115 and the UL_MAP 117. The subchannel used in each frame is not fixed but variable.

Each MAP information element (MAP_IE) represents a MAP for one terminal. Each terminal checks whether a basic connection identifier (basic CID) contained in the MAP_IE is the basic CID of the terminal and transmits/receives bursts through the subchannel on a frequency and symbol represented by a corresponding MAP_IE.

As described above, in the existing IEEE 802.16 broadband OFDMA system, the base station allocates the subchannel to the mobile terminal, which is to be used for transmitting the bursts to each terminal in a corresponding frame through the broadcast data information, such as the DL_MAP and the UL_MAP. However, the base station must transmit burst allocation information to each terminal. The allocation information itself according to the transmission imposes a large overhead on the system. In particular, when a plurality of terminals are connected to the base station, the burst allocation information degrades system performance because the burst allocation information uses more resources of the shared transmission channel.

SUMMARY OF THE INVENTION

Accordingly, the present invention has been made to solve the above-mentioned problems occurring in the prior art, and it is an object of the present invention to provide a method for constructing burst allocation information to reduce overhead.

It is another object of the present invention to provide a method for decreasing system overhead by reducing a connection identifier (CID) used for transmitting burst allocation information in a broadband wireless communication system.

It is further another object of the present invention to provide a method for controlling reduction of a connection identifier (CID) of a terminal connected to a base station by inserting system information representing whether the CID is reduced into a frame in a broadband wireless communication system.

It is still another object of the present invention to provide a method for controlling reduction of a connection identifier (CID) of a terminal, which can change a threshold value of the terminal connected to a base station for determining one of use and non-use of a reduced CID, in a broadband wireless communication system.

In accordance with one aspect of the present invention, there is provided a method for reducing size of burst allocation information by a base station in a broadband wireless communication system in which a transmitted frame includes symbols, orthogonal subcarriers in a frequency axis constitute each of the symbols based on a predetermined time unit, the method comprising: determining types of a reduced CID when a basic CID of a mobile terminal connected to the base station exists within a preset range, in order to reduce the size of the burst allocation information; and transmitting configuration information including an enabled field representing one of use and non-use of the reduced CID to the mobile terminal.

In accordance with another aspect of the present invention, there is provided a method for constructing burst allocation information by a base station in a broadband wireless communication system in which a transmitted frame includes symbols, orthogonal subcarriers in a frequency axis constitute each of the symbols based on a predetermined time unit, the method comprising: setting an enabled field, which represents one of use and non-use and types of a reduced connection identifier (CID), in configuration information when a basic CID of a mobile terminal connected to the base station exists within a preset range; and setting the reduced CID in the burst allocation information in order to reduce size of the burst allocation information.

In accordance with further another aspect of the present invention, there is provided a base station in a broadband wireless communication system in which a transmitted frame includes symbols, orthogonal subcarriers in a frequency axis constitute each of the symbols based on a predetermined time unit, the base station comprising: a controller for determining whether a basic connection identifier (CID) of a terminal exists within a preset range in the base station, and setting an enabled field, which sets types and one of use and non-use of the reduced CID, in configuration information; a preamble setting unit for performing system synchronization between the base station and the terminal; a traffic unit for receiving traffic transmitted from an upper side; and a transmitter for transmitting a frame obtained by multiplexing burst allocation information including the configuration information, a preamble and the traffic to the terminal.

In accordance with still another aspect of the present invention, there is provided a mobile terminal in a broadband wireless communication system in which a transmitted frame includes symbols, orthogonal subcarriers in a frequency axis constitute each of the symbols based on a predetermined time unit, the mobile terminal comprising: a receiver for receiving the frame and performing system synchronization between a base station and the mobile terminal; an burst allocation information detector for detecting burst allocation information from the frame and transmitting the burst allocation information to a controller; the controller for checking an enabled field, which represents types and one of use and non-use of a reduced connection identifier (CID), from the burst allocation information, and setting whether to apply the reduced CID based on the enabled field; and a traffic processor for receiving the frame from the receiver, and decoding the frame by means of the burst allocation information transmitted from the controller.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. The same reference numerals are used to designate the same elements as those shown in other drawings. In the following description of the present invention, a detailed description of known functions and configuration incorporated herein will be omitted when it may make the subject matter of the present invention unclear.

The present invention proposes a method for reducing a CID used for transmitting burst allocation information. Further, the present invention proposes a method for controlling the reduction of a CID of a terminal connected to a base station by inserting system information representing whether the CID is reduced into a frame.

In the following description, it is noted that only portions necessary for understanding the operation of the present invention will be described and a description about remaining portions other than the portions will be omitted within the subject matter of the present invention.

Hereinafter, the frame structures of an uplink and a downlink according to an embodiment of the present invention will be described with reference to FIG. 2.

Figure 2:
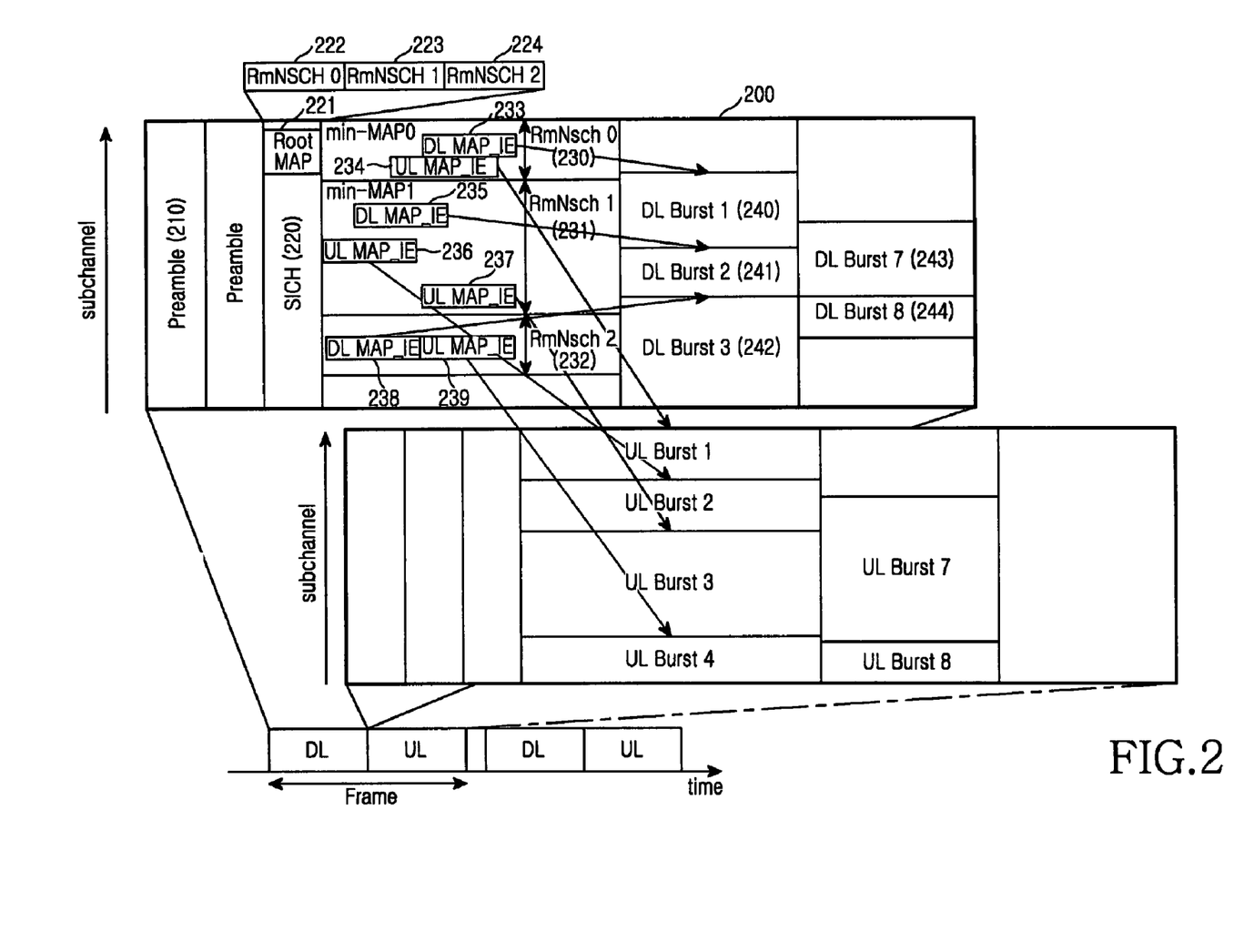
FIG. 2 is a diagram showing the frame structures of an uplink and a downlink in a broadband OFDMA system according to an embodiment of the present invention.

Referring to FIG. 2, a vertical axis represents multiple subchannels and a horizontal axis represents an OFDMA symbol.

A preamble 210 is located at a front portion of the subchannel constituting a downlink 200. Next, System Information Channel (SICH) 220 is transmitted to all terminals in a cell, and a mini MAP 230, which includes a DL MAP element 231 and an UL MAP element 232, are located behind the preamble 210 in sequence. Lastly, DL bursts 240 to 244 of the symbols are located behind the mini MAP 230.

The SICH 220 includes a Root MAP 221 containing physical size information of the mini MAP. The Root MAP 221 includes a Reduced CID Enabled field as an Enabled field to indicate whether a Reduced CID is used.

The Reduced CID Enabled field preferably includes one bit and is enabled when the number of mobile terminals connected to a base station is less than a predetermined threshold value. Alternatively, two or more threshold values may be used. It is also possible to indicate information mapped to a size value of the Reduced CID by including multiple bits as the Enabled field instead of the Reduced CID Enabled field. For example, when the CID type field includes two bits and is set to "00", the CID type field is mapped to a CID of ten bits. When the CID type field is set to "01", the CID type field is mapped to a CID of twelve bits. When the CID type field is set to "10", the CID type field is mapped to a CID of fourteen bits. When the CID type field is set to "11", the CID type field is mapped to a CID of sixteen bits.

As a further alternative, information, such as the Reduced CID Enabled, or the CID type, may be inserted into a first MAP_IE transmitted in each frame instead of the SICH. In this way, the terminals receive the first MAP_IE and understand a CID type to be used when referring to the MAP_IEs corresponding to the terminals.

The Root MAP 221 preferably includes three fields, that is, an RmNsch0 field 222, an RmNsch1 field 223 and an RmNsch2 field 224. The fields have sizes of six, five and five bits, respectively. The RmNsch0 field 222, the RmNsch1 field 223 and the RmNsch2 field 224 indicate the physical sizes of a mini-MAP0 230, a mini-MAP1 231 and a mini-MAP2 232, for which modulation and demodulation have been completed.

Here, a demodulating and decoding scheme used for demodulating and decoding each mini-MAP is predetermined as a $1/12$ QPSK, a $1/2$ QPSK and a $1/2$ 16 QAM, respectively. The mini-MAP0 230 uses the $1/12$ QPSK, which is the smallest demodulating and decoding scheme, and the mini-MAP2 232 uses the largest demodulating and decoding scheme. The terminals connected to the base station may demodulate and decode the mini-MAP0 230. Terminals near the base station may demodulate and decode the mini-MAP2 232.

The mini-MAP0 230 includes multiple MAP_IEs 233 and 234, the mini-MAP1 231 includes multiple MAP_IEs 235, 236 and 237, and the mini-MAP2 232 includes multiple MAP_IEs 238 and 239. Each of the MAP_IEs represents UL-MAP_IEs 234, 236, 237 or 239 of each terminal or DL-MAP_IEs 233, 235 or 238 of each terminal. Further, each of the MAP_IEs represents an MAP for an UL burst and a DL burst corresponding to each MAP_IE.

The present invention proposes a method for reducing the CIDs constituting MAP_IEs contained in the mini-MAPs. First, the construction of a prior art MAP_IE will be described with reference to FIGS. 3A and 3B.

Figure 3A:
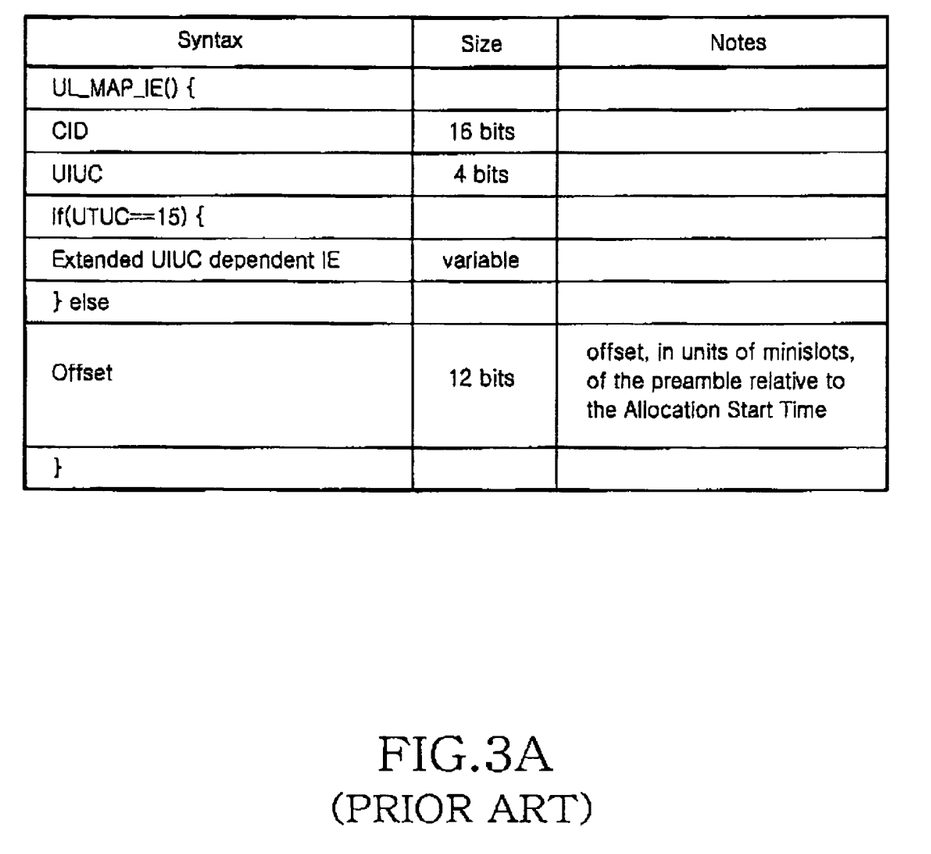
FIG. 3A is a diagram showing the construction of an UL-MAP_IE in a broadband OFDMA system according to the prior art.

FIG. 3A is a diagram showing the construction of a prior art UL-MAP_IE.

Referring to FIG. 3A, the UL-MAP_IE defines 2-dimensional bandwidth allocation information for UL bursts and is arranged in a temporal sequence. Herein, a CID may be allocated to a corresponding UL-MAP_IE as a unicast ID, a multicast ID or a broadcast ID. In accordance with an embodiment of the present invention, the Reduced CID is applied when the CID is a unicast ID.

An Uplink Interval Usage Code ("UIUC") is an indicator for distinguishing a physical parameter for an allocated UL burst. When the UIUC has a value of 15, an Extended UIUC dependent IE is present. In contrast, when the UIUC does not have a value of 15, an offset is present. The offset is an OFDMA symbol offset relating to the start of a corresponding burst and has a unit of one slot. Further, the offset is a relative value for an allocation start time of a UL-MAP message.

Figure 3B:
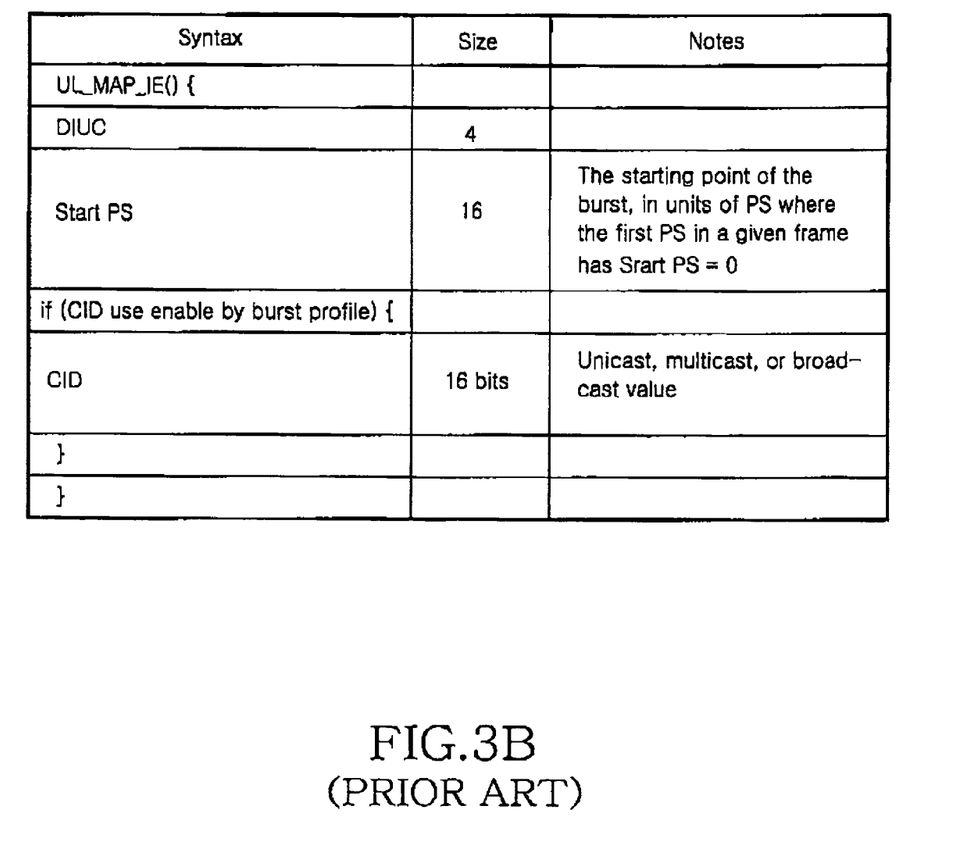
FIG. 3B is a diagram showing the construction of a DL-MAP_IE in a broadband OFDMA system according to the prior art.

FIG. 3B is a diagram showing construction of the DL-MAP_IE.

Referring to FIG. 3BB, the DL-MAP_IE defines 2-dimensional bandwidth allocation information for DL bursts. "UIUC" is an indicator for a physical parameter for an allocated DL burst. A "StartPS" indicates the start position of a burst in a corresponding frame. The CID is present when a corresponding burst is used and the CID is allocated to a corresponding DL-MAP_IE as a unicast ID, multicast or broadcast ID. In accordance with an embodiment of the present invention, the Reduced CID is applied when the CID is unicast.

Figure 4:
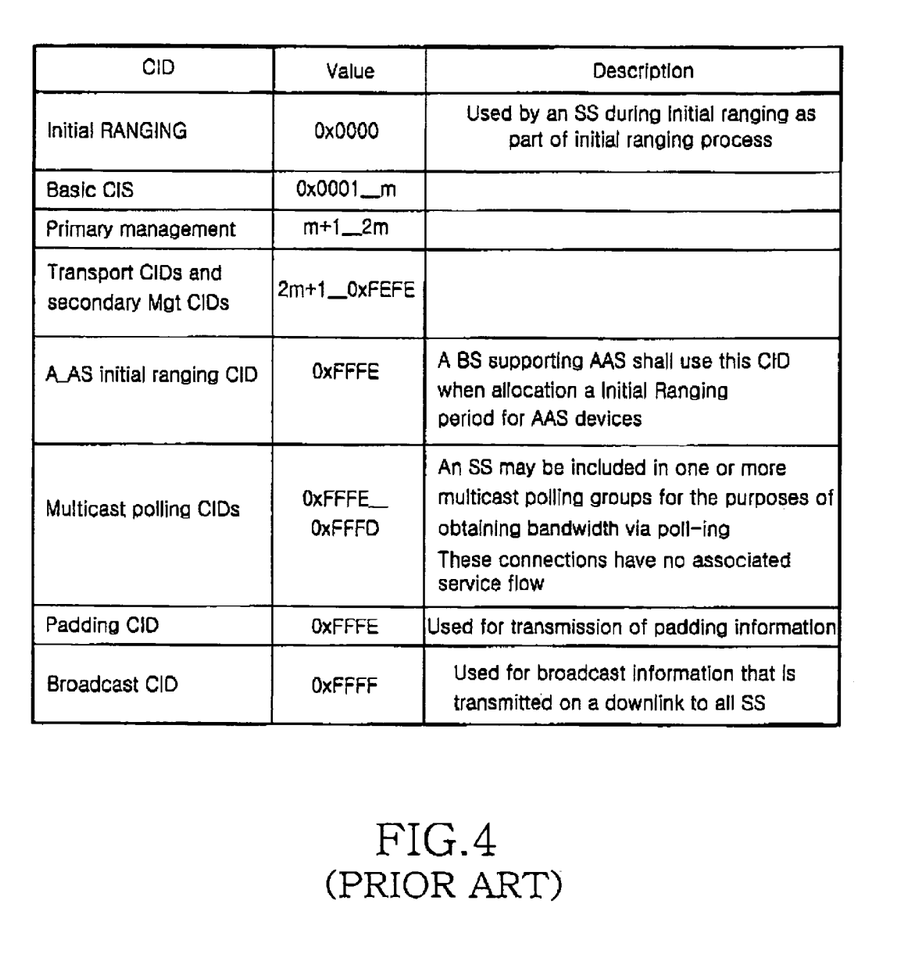
FIG. 4 is a diagram illustrating a CID allocation method in a broadband OFDMA system according to the prior art.

Hereinafter, a method for allocating the CID shown in FIGS. 3AA and 3BB will be described with reference to FIG. 4. Referring to FIG. 4, the basic CID is a CID allocated to each terminal; CIDs from 0x0001 to m may be allocated. The terminal receives one basic CID from the base station when connecting to a network and the base station allocates burst data to the terminal by means of the basic CID when allocating the MAP_IE.

Here, when an Enabled field of one bit is used in the SICH, the present invention limits this allocable value to a predetermined value (e.g., 2^10). Further, when the number of terminals connected to the base station is less than the predetermined value, the base station allocates the MAP_IE of the terminal by the reduced CID instead of the basic CID. Consequently, the basic CID as described above is determined according to the range of significant bits from among the bits {from LSB (Least Significant Bit) to MSB (Most Significant Bit)} of the basic CID. For example, the reduced CID may have a size of 10 bits (from a LSB of the basic CID). Preferably, the reduced CID is no greater than 16 bits.

However, when a reduced CID type field with multiple bits is used, the base station selects the reduced CID size by mapping to a value indicated by the reduced CID type field.

The Reduced CID Enabled and the CID type is preferably inserted into the first MAP_IE transmitted with each instead of the SICH.

Hereinafter, a method for reducing a CID according to a preferred embodiment of the present invention is described with reference to FIGS. 5 to 7.

Figure 5:
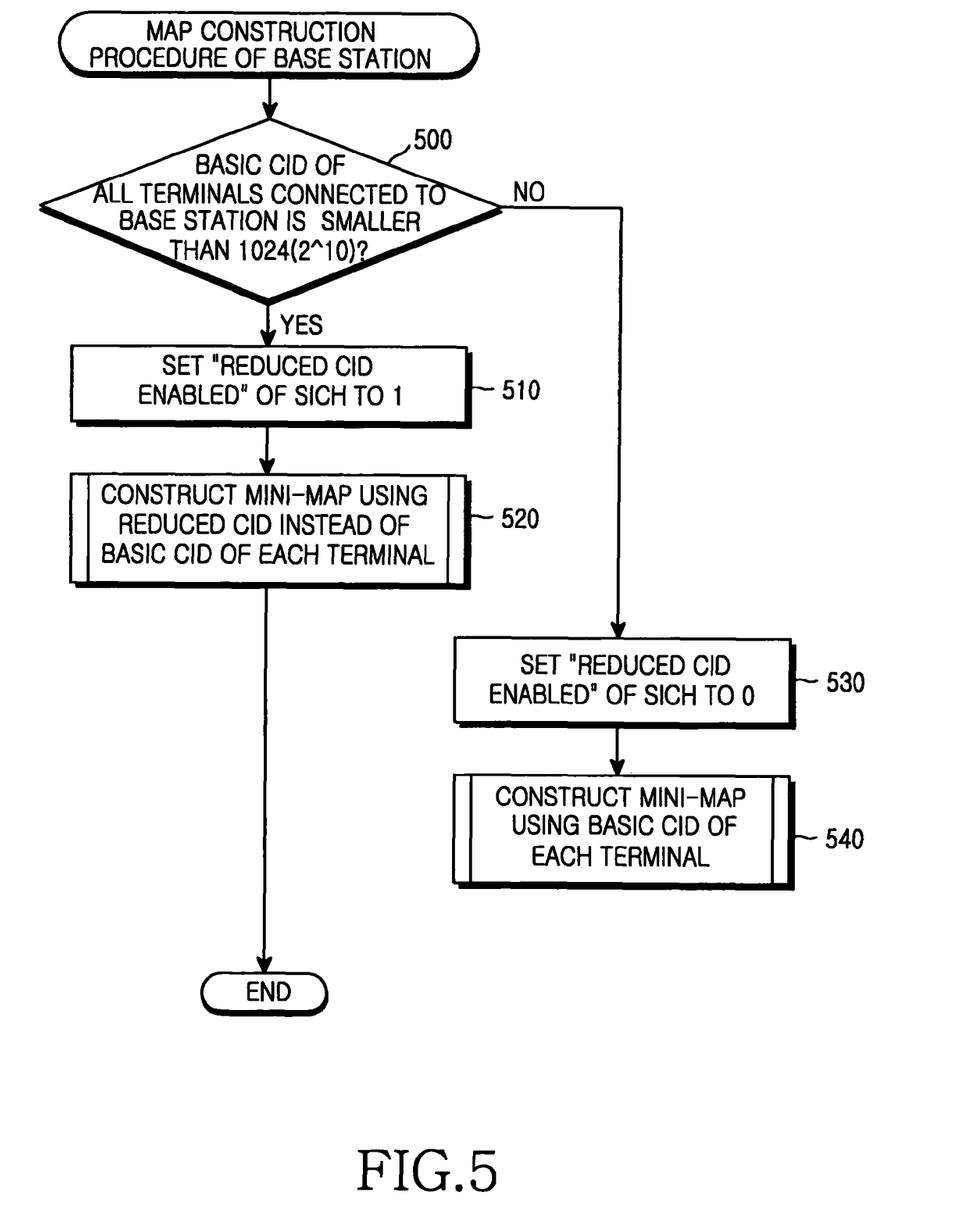
FIG. 5 is a flow diagram illustrating a method for generating an MAP_IE in a base station using a Reduced CID according to a first embodiment of the present invention.
Figure 6:
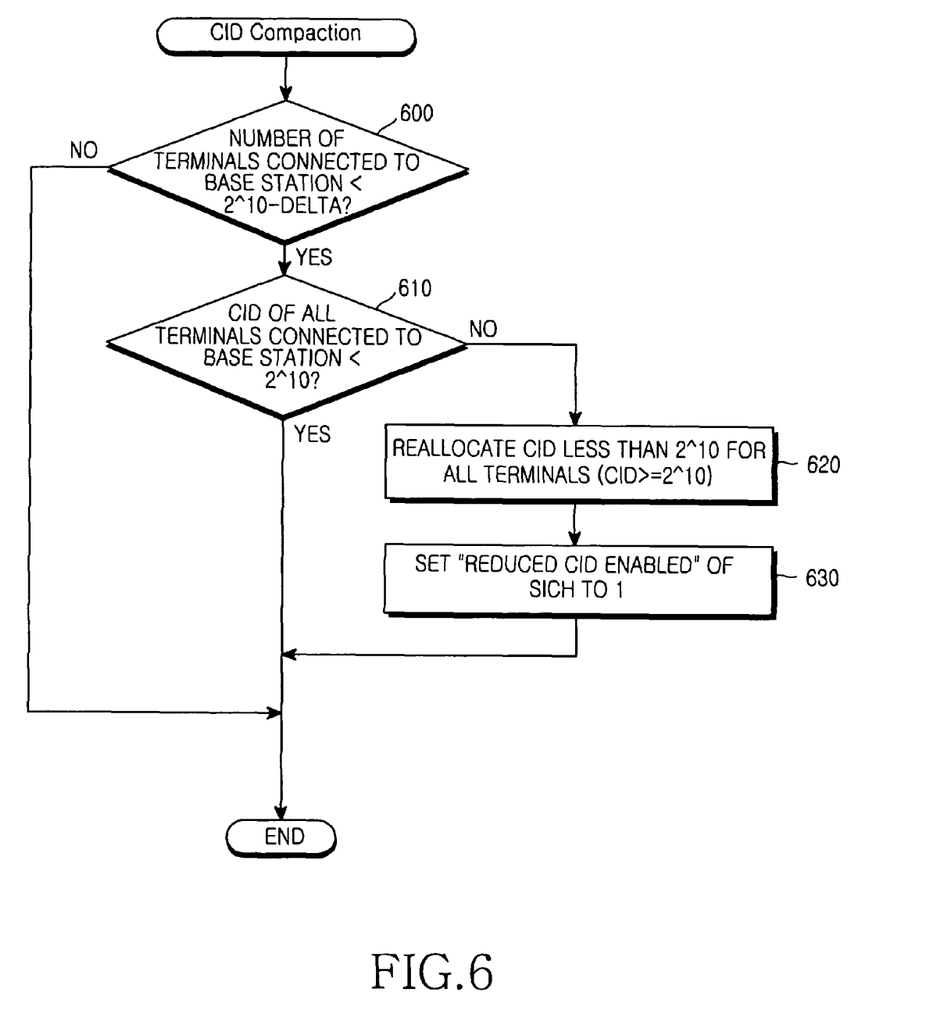
FIG. 6 is a flow diagram illustrating a CID compaction method for changing a basic CID to a Reduced CID in a base station using the Reduced CID according to a first embodiment of the present invention.

FIG. 5 is a flow diagram illustrating a first embodiment using a reduced CID limited to one, and FIG. 6 is a flow diagram illustrating a second embodiment including multiple usable reduced CIDs.

FIG. 5 is a flow diagram illustrating a method for generating, by a base station, a MAP_IE according to a value set in a Reduced CID Enabled field according to the first embodiment of the present invention.

Referring to FIG. 5, the base station determines whether the number of terminals connected to the base station is less than a predetermined threshold value (2^10) in step 500. When the number of terminals is less than the threshold value, the base station sets the Reduced CID Enabled field in the SICH of a transmission frame to 1 in step 510.

In step 520, the base station forms the MAP_IE with a 10 bit Reduced CID instead of the basic CID when transmitting a corresponding frame.

When the number of terminals connected to the base station is greater than the threshold value (2^10), the base station sets the Reduced CID Enabled field in the SICH to 0 in step 530 and generates the MAP_IE with the existing basic CID when generating the burst allocation information for each terminal in step 540.

FIG. 6 is a flow diagram illustrating a CID compaction method for using the Reduced CID when the number of terminals connected to the base station falls below the predetermined number and where the base station using the Reduced CID has set the Reduced CID Enabled field to have a value of 0 according to the first embodiment of the present invention.

This procedure relates to a method for using the Reduced CID when the number of terminals connected to the base station is reduced below a constant level (e.g., $2^{10}$—delta, delta is a positive integer), and where the base station generates the MAP_IE with the existing basic CID when the number of terminals connected to the base station is greater than the specific number ($2^{10}$). Herein, delta is a margin value for preventing the CID compaction from occurring too frequently when the number of terminals changes around the specific number ($2^{10}$). Delta is determined while considering predetermined variables, such as communication environments by an operator.

Referring to FIG. 6, the base station determines whether the number of currently connected terminals is less than a predetermined number in step 600. When the number of currently connected terminals is less than the predetermined level, the base station extracts terminals having basic CIDs more than a specific value ($2^{10}$) in step 610. The base station reallocates the basic CIDs, less than the specific value ($2^{10}$), of the extracted terminals in step 620. Then, the base station sets the Reduced CID Enabled field in the SICH to 1 in step 630. In this way, the base station uses the Reduced CID of the LSB of 10 bits in the basic CID (16 bits) instead of the basic CID in generating the MAP_IE from the next frame.

Figure 7:
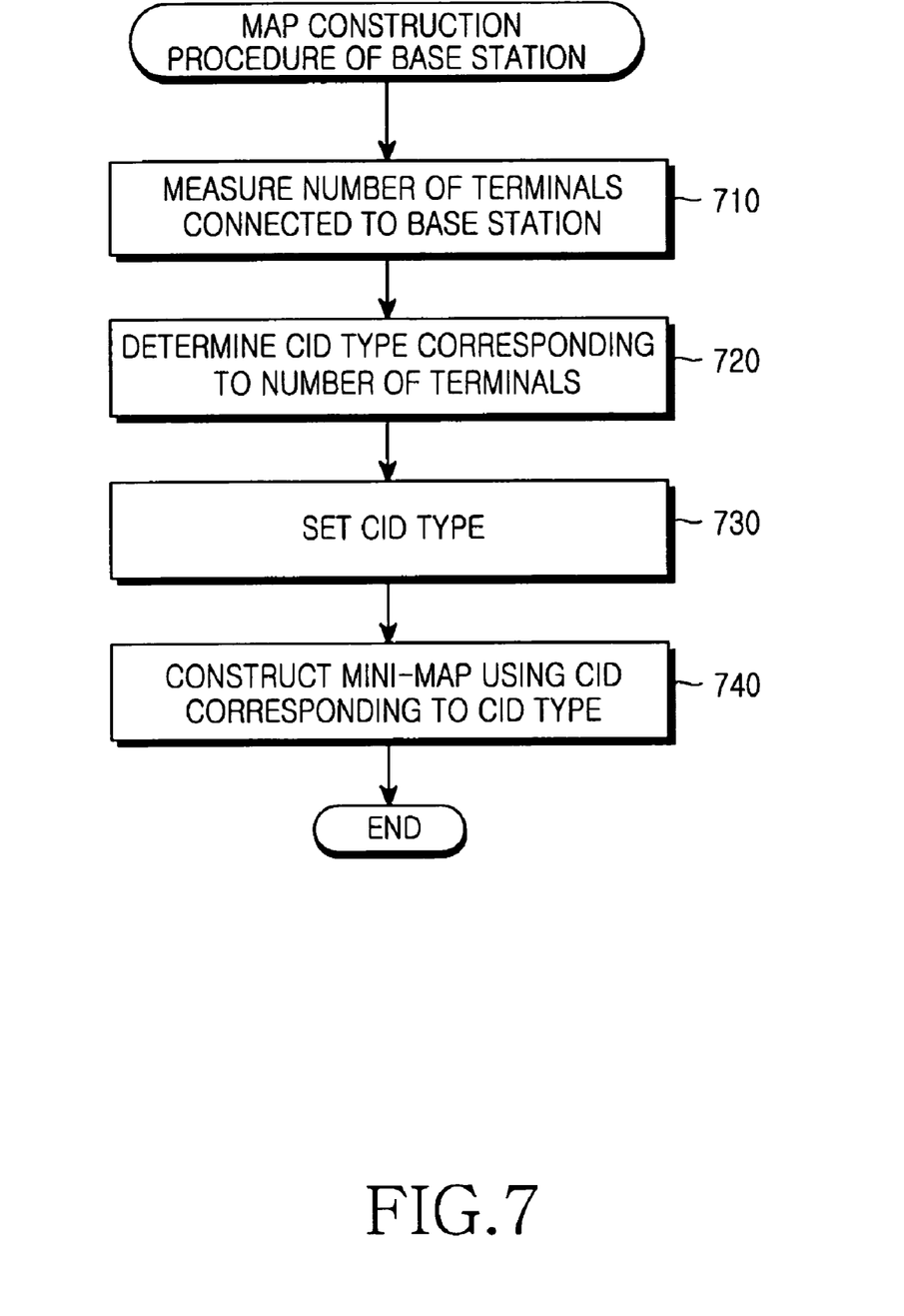
FIG. 7 is a flow diagram illustrating a method for generating an MAP_IE in a base station selectively using a plurality of CIDs according to a second embodiment of the present invention.

FIG. 7 is a flow diagram illustrating a method for setting a MAP_IE in a base station using multiple CIDs according to a second embodiment of the present invention.

Referring to FIG. 7, the base station measures the number of terminals connected to the base station in step 710. Then, the base station selects a CID corresponding to the number of terminals in step 720. The base station selects a threshold value closest to the number of terminals from among a plurality of threshold values. For example, when the threshold value is $2^{10}$, $2^{12}$, $2^{14}$ or $2^{16}$ and the number of terminals connected to the base station is $2^{13}$, the base station selects the $2^{14}$ as the threshold value.

Thereafter, the base station determines a CID type corresponding to the threshold value. For example, when the threshold value is $2^{10}$, the CID type of 10 bits is determined. When the threshold value is $2^{12}$, the CID type of 12 bits is determined. When the threshold value is $2^{14}$, the CID type of 14 bits is determined. When the threshold value is $2^{16}$, the CID type of 16 bits is determined.

In step 730, the base station maps a CID type field to '00', '01', '10' or '11' according to the determined CID type as described above. Herein, the base station may insert the CID type into the SICH or a mini MAP in step 740 according to the corresponding embodiment described above.

In step 740, the base station forms the mini MAP using the CID corresponding to the determined CID type.

Figure 8:
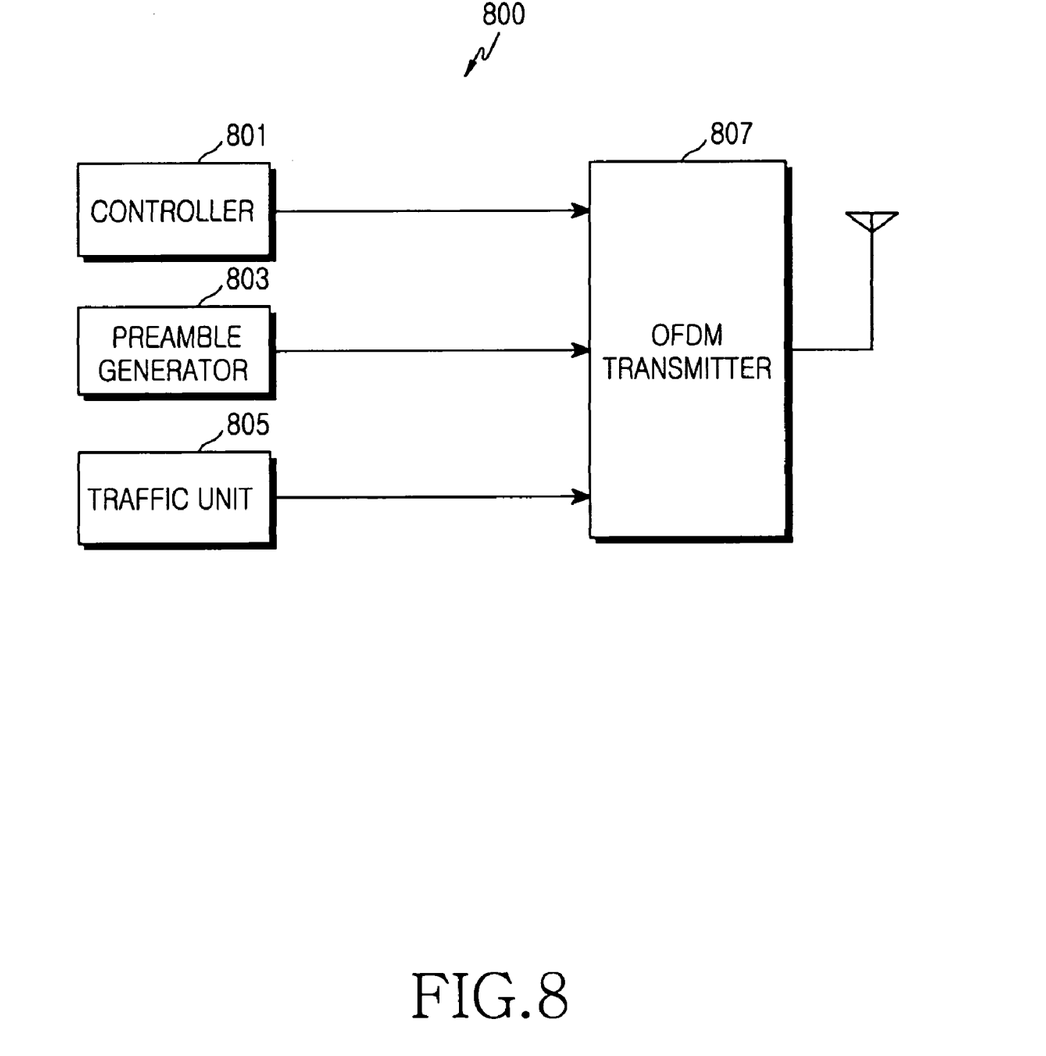
FIG. 8 is a block diagram showing the construction of a base station according to an embodiment of the present invention.

Hereinafter, the construction of the base station according to an embodiment of the present invention will be described.

FIG. 8 is a block diagram showing the construction of the base station 800 according to the present invention. Referring to FIG. 8, a controller 801 determines whether the basic CID of a terminal exists within a preset range. When it does, the controller 801 forms an Enabled field that indicates whether a Reduced CID is used, in a MAP_IE. The Enabled field may also use a Reduced CID Enabled field and a CID type field with multiple bits and a plurality of reference values.

The controller 801 generates the Reduced CID according to the Enabled field. For example, when the Enabled field is a CID type field of 2 bits, the CID type field may have four values, that is, '00', '01', '10' and '11'. Herein, '00' represents the use of a basic CID. Further, when the CID type field is '01', '10' or '11', the controller 801 performs a mapping by means of a preset type of Reduced CID. Then, the controller 801 sets the Reduced CID in a MAP.

A preamble generator 803 performs system synchronization in generating a frame and generates the preamble for determining the cell of a terminal. The preamble may also be used for channel estimation when the terminal performs data recovery; the preamble uses a plurality of preset patterns.

A traffic unit 805 stores traffic that is transmitted to an upper side, such as a base station controller, in an internal buffer.

An OFDM transmitter 807 multiplexes MAP generated by the controller 801, the preamble and the traffic information, and generates a frame to be transmitted to the terminal. Since a device for a multiplexing and an inverse fast Fourier transform in the OFDM transmitter 807 is not within the scope of the present invention, discussion of the device will be omitted.

Hereinafter, a method for transmitting burst allocation information by the base station 800 will be described with reference to FIG. 9.

Figure 9:
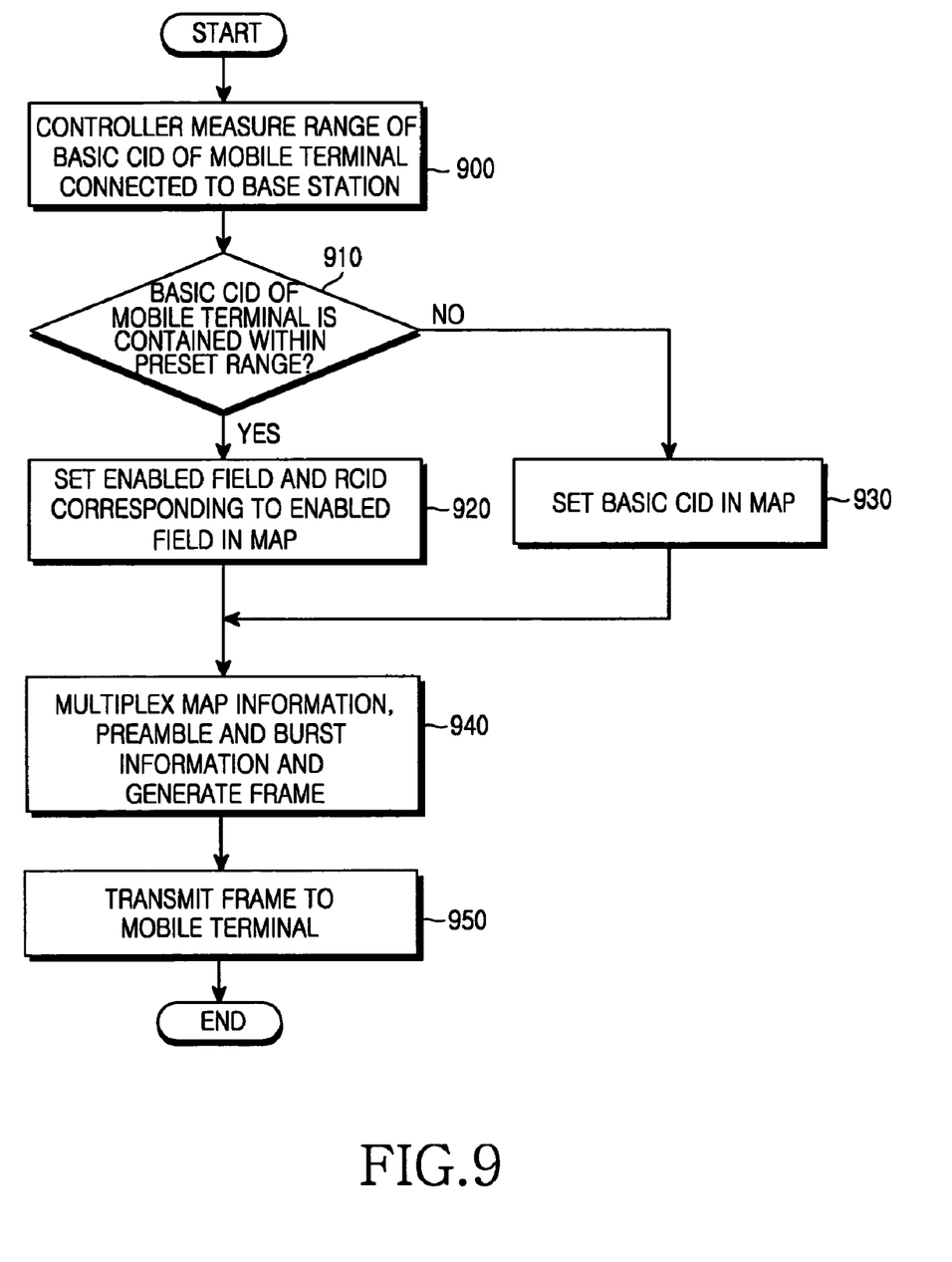
FIG. 9 is a flow diagram illustrating a method for transmitting burst allocation information by a base station according to an embodiment of the present invention.

Referring to FIG. 9, in step 900, the controller 801 of the base station 800 measures the basic CID range for a mobile terminal. In step 910, the controller 801 determines whether the basic CID of the mobile terminal connected to the base station 800 is contained within the preset range. When it is, the controller 801 generates an Enabled field, to indicate use of a Reduced CID, the type of the Reduced CID, and the Reduced CID according to the Enabled field, and stores the generated Enabled field and Reduced CID in the MAP, in step 920. In step 940, the OFDM transmitter 807 multiplexes the MAP, the preamble and the traffic information, and generates the frame. In step 950, the OFDM transmitter 807 transmits the generated frame to the mobile terminal.

When the basic CID of the mobile terminal is not contained within the preset range (step 910), the controller 801 sets the basic CID in the MAP in step 910. After that, the OFDM transmitter 807 multiplexes the MAP, the preamble and the traffic information, and generates the frame in step 940.

Hereinafter, construction of the mobile terminal will be described with reference to FIG. 10.

Figure 10:
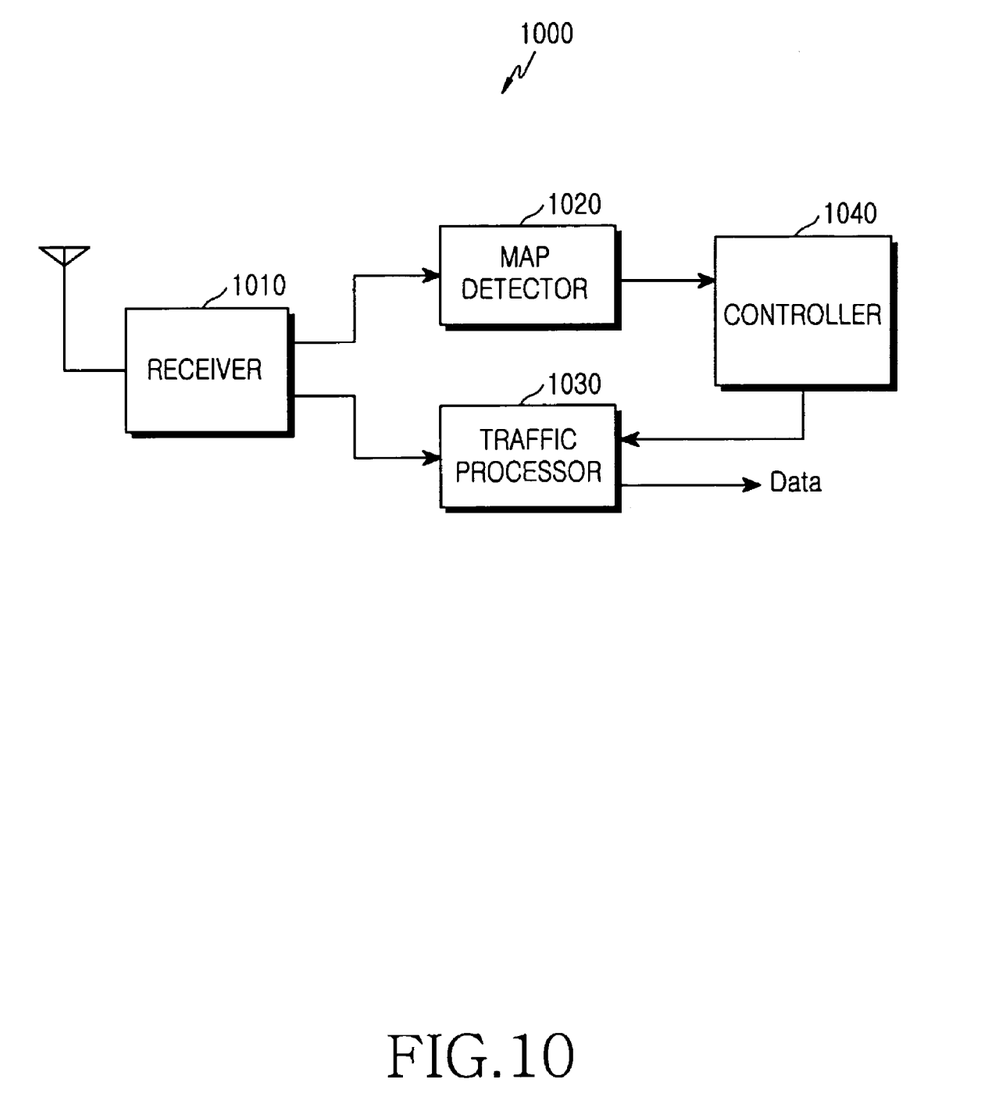
FIG. 10 is a block diagram showing the construction of a mobile terminal according to an embodiment of the present invention.

Referring to FIG. 10, the receiver 1010 of the mobile terminal 1000 receives the frame from the base station 800. The receiver 1010 detects the preamble from the received frame and performs system synchronization.

A MAP detector 1020 receives the frame and detects the MAP therein. Then, the MAP detector 1020 transmits the detected MAP to a controller 1040.

The controller 1040 checks the Enabled field to determine whether the Reduced CID from the MAP is present. When the Reduced CID is used after checking the Enabled field, the controller 1040 detects reception traffic data by applying the Reduced CID. When the Reduced CID is not used, the controller 1040 detects the reception traffic data by applying the conventional basic CID. When the Enabled field is the CID type field including the multiple bits, the controller 1040 sets the one of use and non-use of the Reduced CID and the type of the Reduced CID.

A traffic processor 1030 includes a buffer, stores traffic data transmitted from the receiver 1010, and decodes the traffic data using the MAP transmitted from the controller 1040.

Hereinafter, a method for receiving the burst allocation information from the base station 800 in the mobile terminal 1000 will be described with reference to FIG. 11.

Figure 11:
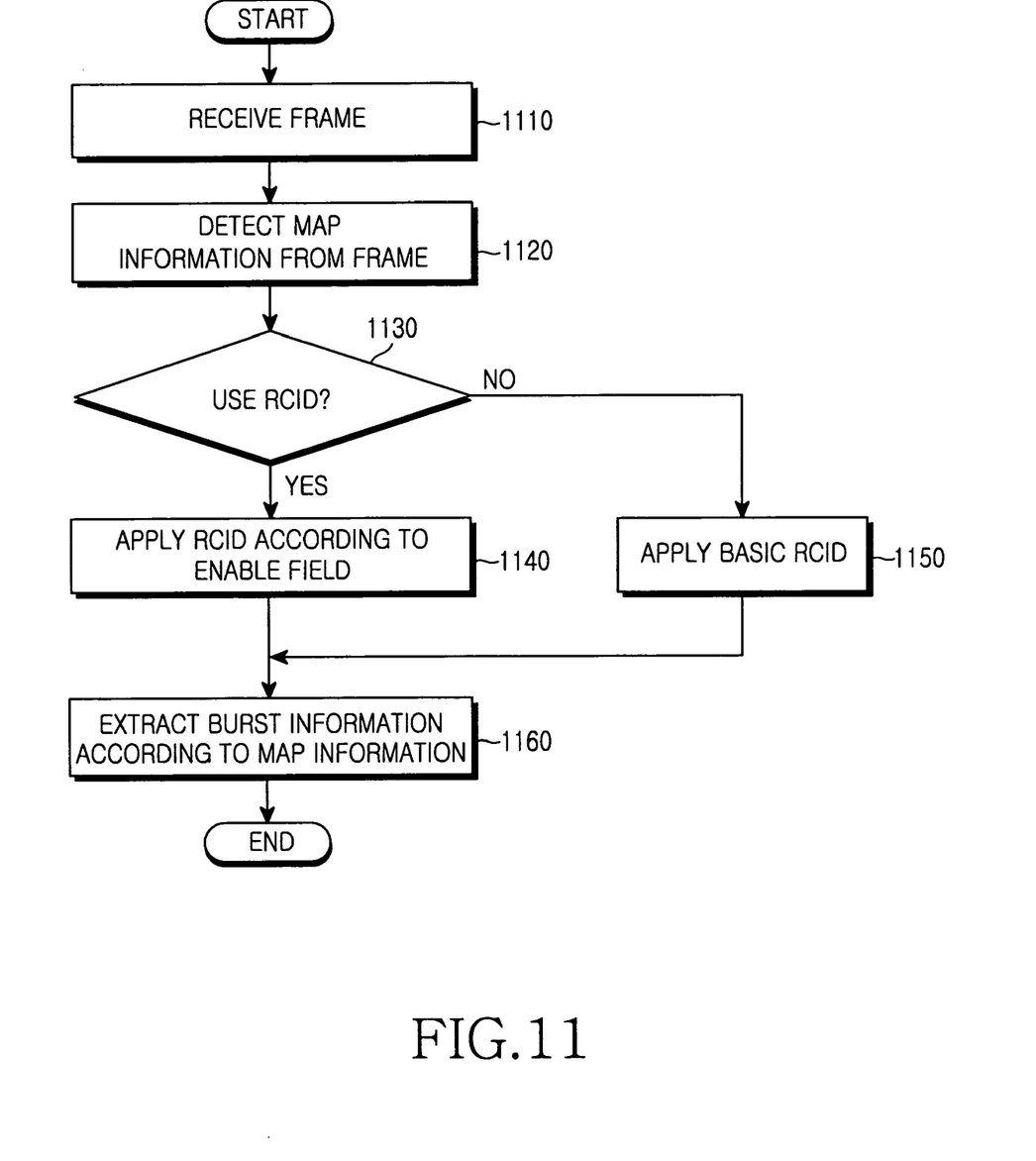
FIG. 11 is a flow diagram illustrating a method for receiving by a mobile terminal burst allocation information from a base station.

Referring to FIG. 11, first, the mobile terminal 1000 receives the frame transmitted from the base station 800 through the receiver 1010 in step 1110. The receiver 1010 performs system synchronization between the base station 800 and the mobile terminal 1000 by means of the preamble of the received frame. The receiver 1010, having performed the system synchronization, transmits the frame to the MAP detector 1020. In step 1120, the MAP detector 1020, having received the frame, detects the MAP from the frame and transmits the detected MAP to the controller 1040. In step 1130, the controller 1040 checks the Enabled field of the MAP and checks whether the Reduced CID was used.

When the Reduced CID is used, step 1140 is performed. In step 1140, the controller 1040 applies the Reduced CID based on the Enabled field. When the CID type field is used as the Enabled field, the controller 1040 may set one of use and non-use of the Reduced CID and the type of the Reduced CID. In step 1160, the controller 1040 extracts burst information by means of the MAP including the traffic data stored in the traffic processor 1030.

In step 1130, when the Reduced CID is not used, step 1150 is performed. In step 1150, the controller 1040 applies and uses the basic CID. In step 1160, the controller 1040 extracts the burst information by means of the MAP, including the received traffic data.

According to the present invention as described above, in transmission of burst allocation information in an IEEE 802.16 broadband OFDMA system, system overhead can be reduced when an MAP_IE for burst allocation is transmitted by means of a Reduced CID, obtained by reducing a basic CID of a corresponding terminal.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for reducing a size of burst allocation information by a base station in a broadband wireless communication system, the method comprising:
    determining a type of a reduced connection identifier (CID) based on a range of a basic CID of a mobile subscriber station connected to the base station; and
    transmitting configuration information including a type field representing the type of the reduced CID to the mobile subscriber station,
    wherein the type field includes at least two bits representing one of the basic CID and available types of the reduced CID,
    wherein the available types of the reduced CID represent available lengths of the reduced CID, and
    wherein the reduced CID includes n Least Significant Bits (LSBs) of the basic CID, n being a positive integer indicated by the type field.

2. The method in claim 1, wherein the configuration information is disposed at a start portion of the burst allocation information.

3. The method in claim 1, further comprising transmitting the burst allocation information including the reduced CID to the mobile subscriber station.

4. A broadband wireless communication system comprising:
    a base station for transmitting configuration information including a type field representing a type of a reduced connection identifier (CID) to a mobile subscriber station, wherein the type of the reduced CID is determined by the base station based on a range of a basic CID of the mobile subscriber station connected to the base station; and
    the mobile subscriber station for checking the type field in the configuration information transmitted from the base station, and applying the reduced CID based on the type field,
    wherein the type field includes at least two bits representing one of the basic CID and available types of the reduced CID,
    wherein the available types of the reduced CID represent available lengths of the reduced CID, and
    wherein the reduced CID includes n Least Significant Bits (LSBs) of the basic CID, n being a positive integer indicated by the type field.

5. A method for reducing a size of burst allocation information by a mobile subscriber station in a broadband wireless communication system, the method comprising:
    receiving configuration information including a type field representing a type of a reduced connection identifier (CID) from a base station; and
    selectively applying the reduced CID based on the type field,
    wherein the type of the reduced CID is determined by the base station based on a range of a basic CID of the mobile subscriber station connected to the base station,
    wherein the type field includes at least two bits representing use of one of the basic CID and available types of the reduced CID,
    wherein the available types represent available lengths of the reduced CID, and
    wherein the reduced CID includes n Least Significant Bits (LSBs) of the basic CID, n being a positive integer indicated by the type field.

6. The method in claim 5, further comprising:
    detecting burst allocation information from a received frame; and
    checking the type field from the burst allocation information to determine whether to apply the reduced CID based on the type field.

* * * * *